US007430588B2

(12) United States Patent
Hunter

(10) Patent No.: US 7,430,588 B2
(45) Date of Patent: *Sep. 30, 2008

(54) AUTOMATIC ACCESS OF A NETWORKED RESOURCE WITH A PORTABLE WIRELESS DEVICE

(75) Inventor: Kevin D Hunter, Fort Myers, FL (US)

(73) Assignee: NedMedia Technologies, Inc., Atlanta, GA (US)

( * ) Notice: Subject to any disclaimer, the term of this patent is extended or adjusted under 35 U.S.C. 154(b) by 416 days.

This patent is subject to a terminal disclaimer.

(21) Appl. No.: 11/269,139

(22) Filed: Nov. 8, 2005

(65) Prior Publication Data
US 2006/0155874 A1 Jul. 13, 2006

(51) Int. Cl.
G06F 15/16 (2006.01)
(52) U.S. Cl. ............. 709/218; 709/203; 709/206; 709/217; 235/462.11; 235/462.45; 235/462.46
(58) Field of Classification Search ............. 709/203, 709/206, 217, 218, 219; 235/462.11, 462.45
See application file for complete search history.

(56) References Cited

U.S. PATENT DOCUMENTS 6,993,573 B2 *  1/2006  Hunter .................. 709/218
7,016,532 B2     3/2006  Boncyk et al.

OTHER PUBLICATIONS

Third Party Observations from Svenja Frenkler to EPO, Nov. 10, 2006.

* cited by examiner

Primary Examiner—Yves Dalencourt
(74) Attorney, Agent, or Firm—Anthony R. Barkume

(57) ABSTRACT

A portable wireless device that is adapted to image a machine readable code such as a bar code, decode the bar code, send the bar code data over the Internet to a resolution server that will return an associated URL that will link the portable wireless device to content on an information server. Thus, by taking a picture of a bar code symbol, the portable wireless device will automatically retrieve content from the Internet that has been linked to that bar code via the present invention.

18 Claims, 1 Drawing Sheet

AUTOMATIC ACCESS OF A NETWORKED RESOURCE WITH A PORTABLE WIRELESS DEVICE

CROSS-REFERENCE TO RELATED APPLICATIONS

This application is based on and claims priority from U.S. application Ser. No. 10/863,580, filed on Jun. 7, 2004, now U.S. Pat. No. 6,993,573, which claims priority from then U.S. Provisional Application Ser. No. 60/476,496, which was filed on Jun. 6, 2003, which is incorporated by reference herein

BACKGROUND OF THE INVENTION

The present invention relates to wireless access of Internet content, in particular to the use of a portable camera/cell phone device for scanning bar codes and automatically downloading associated web content that is linked to the scanned bar code.

Systems exist in the prior art that allow a user to scan a bar code such as a product UPC code (or other machine-readable indicia), decode the bar code data, and send the decoded bar code data to an offsite server computer, where the server computer looks up a URL associated with that bar code in a database and sends the retrieved URL back to the user's computer. A browser at the user's computer then uses the URL to retrieve web content associated with the URL. This type of system, for example disclosed in U.S. Pat. Nos. 5,978,773 and 6,199,048 (owned by the assignee of the present invention, NeoMedia Technologies, Inc.), allows a user to automatically link to web content by simply scanning a bar code with a scanner attached to the user's PC. In another type of system, disclosed in U.S. Pat. No. 6,542,933, also owned by NeoMedia Technologies, Inc., a special bar code known as a PaperClick code is scanned, and the decoded data in parsed into two portions (a server ID and an item ID), with the server ID used to retrieve a URL template that is sent back to the user's PC, which then assembles a full URL by inserting the item ID from the bar code into the URL template, which is then used to retrieve the linked web content.

It is desired to be able to utilize this type of automatic web content retrieval system with portable devices that are not tethered to the user's PC. Such a portable device would allow a user to automatically access linked web content at any location, and not just when using his desktop PC. However, portable devices that can scan barcodes are not widely deployed. In addition, it is most convenient for the person scanning a PaperClick code or UPC code to be able to see the results immediately, even if they are not at their computer. A desired application for a portable device under this invention is for a user to enter a Barnes & Noble store, see a book he likes, scan the barcode on the back, and see what Amazon.com's price is, all without involving anything that one would normally consider a computer.

SUMMARY OF THE INVENTION

The present invention is a cellular telephone having an embedded or attachable camera and wireless Internet access capabilities, adapted to image a bar code symbol and retrieve related web content automatically, without the user being tethered to a desktop PC as in the prior art. The invention uses a camera phone adapted to perform the desired functions described herein. By adapting a camera phone in accordance with the invention, a consumer having such a camera phone can be provided with the value-added functionality of taking a picture of a bar code on a product, and having the camera phone automatically obtain information on the product, which may be for example prices from a search engine or sponsored web content.

The present invention utilizes a client program that operates a cell phone with a built-in camera and web browser. When the user activates the client on the camera phone, it provides a real-time on-screen display of what the camera is imaging. When the user presses the trigger, the camera phone grabs the image, uses an image-based decode algorithm to locate and decode a barcode, then invokes the built-in web browser, pointing it at a resolution server on the Internet with the barcode value it decoded. The resolution server takes the data sent from the camera phone and resolves the data into a URL in one of several ways, depending on the application (to be described later).

Thus, the present invention is a method for accessing content from an information server computer on a computer network such as the Internet using a camera-enabled cell phone. First, an image of a machine-readable code such as a bar code symbol is captured with the camera-enabled cell phone. The captured bar code image is processed to decode the bar code into a file identifier, and a request URL is formed that includes the file identifier. The request URL is then transmitted to a resolution server computer on the computer network. At the resolution server computer, an information URL is determined as a function of the request URL. The information URL is then returned to the camera-enabled cell phone, which in turn transmits the information URL to an information server computer designated by the information URL. The information server computer receives the information URL and returns content to the camera-enabled cell phone as a function of the information URL.

The request URL sent by the camera-enabled cell phone may optionally include a device identifier that serves to identify certain operating characteristics of the camera-enabled cell phone, such as the browser capabilities. In this case, the information URL will be determined as a function of the device identifier. This allows different information URLs to be returned for different devices, based on their display capabilities, so that each device will retrieve content that is optimized for display on that particular device.

The information URL may also be determined at the resolution server by extracting the file identifier from the request URL; and then querying a database with the file identifier. The resolution server database will have a plurality of mappings of file identifiers to associated information URLs.

In a further embodiment, the camera-enabled cell phone will capture an image of a machine-readable code with a camera-enabled cell phone and then process the captured image to decode the machine-readable code into a file identifier that contains a server ID and an item ID. A request URL is formed that includes the file identifier. The request URL is transmitted to a predetermined gateway server on the computer network, which analyzes the server ID to determine an associated resolution server on the computer network. The gateway server sends the item ID to the resolution server that is associated with the server ID to obtain an information URL as a function of the server ID and the item ID. The resolution server returns the information URL to the gateway server, and the gateway server interacts with the camera-enabled cell phone to send the information URL to an information server computer designated by the information URL and receive content from the information server computer as a function of the information URL.

In this embodiment, the gateway server interacts with the camera-enabled cell phone to send the information URL to an information server computer designated by the information URL and receive content from the information server computer as a function of the information URL in either of two ways. First, the gateway server may send the information URL to the information server computer designated by the information URL. The gateway server would then receive content from the information server computer as a function of the information URL and send the content received from the information server to the camera-enabled cell phone. Alternatively, the gateway server may send the information URL to the camera-enabled cell phone, and the camera-enabled cell phone then sends the information URL to the information server computer designated by the information URL. The camera-enabled cell phone then receives content from the information server computer as a function of the information URL.

In order to carry out this invention, the camera-enabled cell phone of the present invention includes a housing with a cellular telephone transceiver, a digital camera module having a camera lens, a display screen, and processing circuitry that interoperates with these components. In particular, the processing circuitry is adapted or programmed to cause the cellular telephone transceiver to selectively communicate with a cellular telephone network to place and receive cellular telephone calls, and to communicate with server computers via a browser program on a global computer network. The processing circuitry is also adapted to capture, via the digital camera module, an image of a machine-readable code, to process the captured image to decode the machine-readable code into a file identifier, to form a request URL comprising the file identifier and to transmit, via the cellular telephone transceiver, the request URL to a resolution server computer on the global computer network. The processing circuitry is also adapted to receive from the resolution server an information URL determined by the resolution server as a function of the request URL, interoperate with the browser program to transmit the information URL received from the resolution server to an information server computer designated by the information URL, receive content from the information server computer as a function of the information URL, and to display the received content on the display screen.

DETAILED DESCRIPTION OF THE INVENTION

Figure 1:
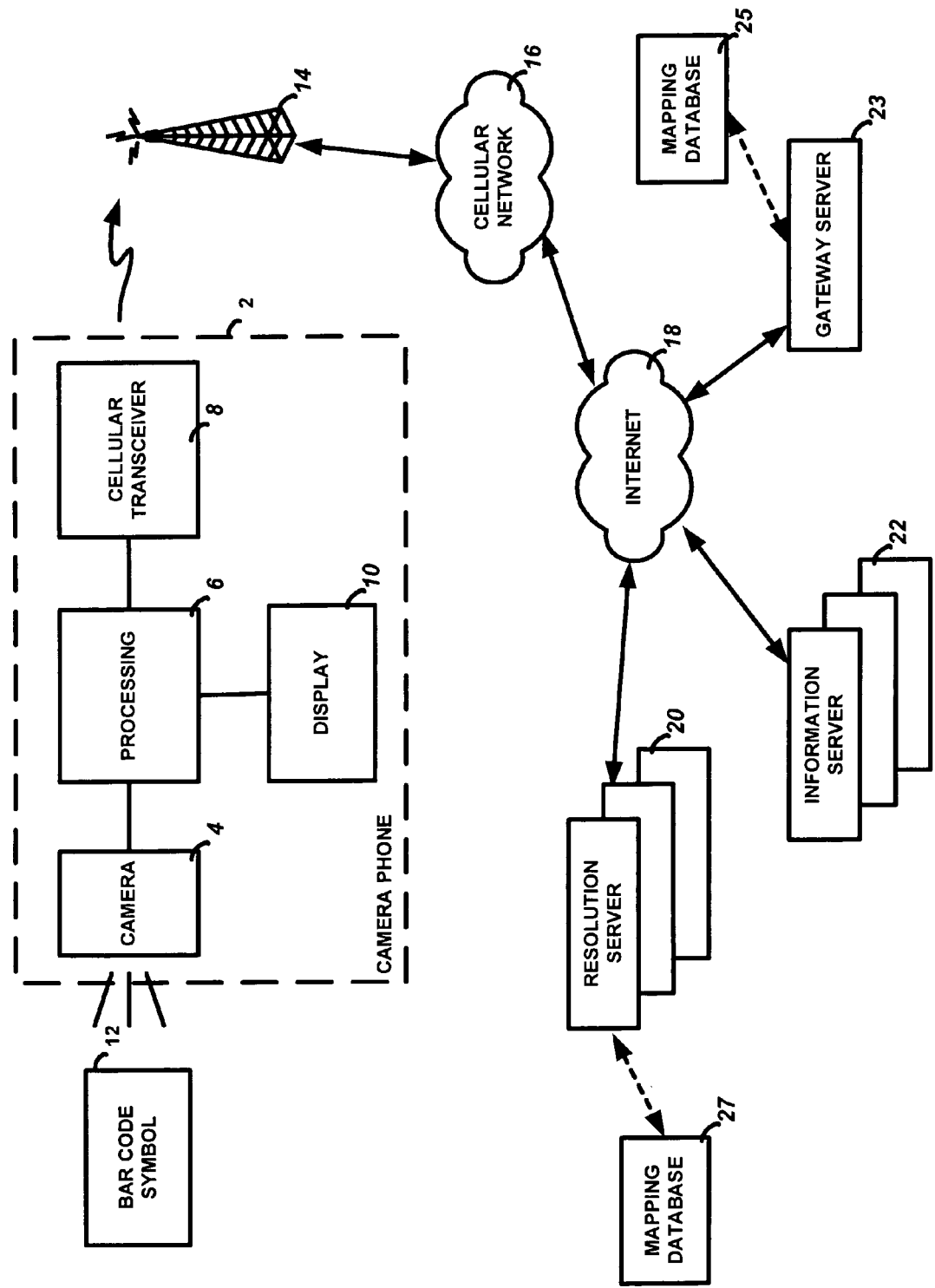
FIG. 1 shows a basic block diagram of the operation of the present invention.

FIG. 1 shows a basic block diagram of the operation of the present invention. A camera-enabled cell phone 2 (also referred to herein as a camera phone) includes, in one housing, a digital camera module 4, a display screen 10, a cellular telephone transceiver 8, processing circuitry 6, and various user input devices (such as keys, buttons, microphone, touch-screen display) as well as output devices (such as a speaker) not shown for the purpose of clarity but well known in the art of cell phones. It is noted that although the preferred embodiment described herein utilizes an integrated camera phone (i.e. a cell phone with a built-in camera), the present invention is also intended to operate with a cell phone having an attachable camera, e.g. via an input/output port, as well. Likewise, any device that utilizes the functionality of a cellular or wireless phone and an imaging device such as a digital camera is covered by this invention as well.

A user invokes the appropriate client application on the phone (described below), and then images (takes a picture of), with the camera 4, the target bar code symbol 12 or other machine readable code. The processing circuitry 6 decodes the bar code image obtained by the camera 4 and generates a request, typically in the form of a request URL having all or part of the decoded bar code integrated therewith, for sending out via the cell phone's wireless transceiver 8. This is typically done via a wireless Internet connection as known in the art.

The request URL is sent wirelessly via a local antenna 14, through the cellular network 16 and the Internet 18, to the destination server, which is referred to as a resolution server 20. The resolution server 20 accepts the request URL and parses out the bar code data from it. The resolution server 20 then looks up the bar code data on a mapping database 27 and retrieves an associated information URL, which is then sent back to the camera phone 2 and handed to a web browser program, which is then redirected by the information URL to the appropriate information server 22 on the Internet. The content requested by the information URL is sent from the information server 22 to the browser on the camera phone 2 and displayed thereon for the user. Thus, by invoking the appropriate client software on the phone 2 as described herein, the user can image or take a picture of a bar code and have content driven to his display 10 that is associated with that bar code 12.

Various methodologies are known in the art that control how the bar code symbol is used to retrieve content from the Internet. In the basic case mentioned above, there is a simple mapping function carried out by the resolution server 20, which takes the decoded bar code data and looks up a preprogrammed information URL in its database 27. This is shown, for example, in U.S. Pat. No. 5,978,773, which is incorporated by reference herein. In an alternative embodiment, the bar code may be parsed into a server ID and an item ID, as taught in U.S. Pat. No. 6,542,933, which is incorporated by reference herein. Moreover, the content returned to the camera phone 2 may be specifically tailored for display on the small display of that device. This may be accomplished by using a methodology referred to as device-specific profiled routing, in which the request URL is assembled by the camera phone based on an additional parameter that is a device identification code, which designates if that client device is a wireless device that supports, for example, WML content, or XHTML content. By signaling to the resolution server 20 that the requesting device is WAP compliant, then the information URL sent to the camera phone will redirect its browser to an appropriate web site with WML content (wherein if the same bar code were used to request content via a full screen monitor on a desktop, the full HTML page would be returned). This device based profile routing is fully described in U.S. application Ser. No. 09/821,535, DEVICE-BASED ROUTING FOR WEB CONTENT RETRIEVAL, owned by the assignee of the present invention, the specification of which is incorporated by reference herein.

In an alternative embodiment, another server computer referred to as a gateway server 23 is utilized. The gateway server 23 acts essentially as a proxy server that receives request URLs from the camera phone, processes these requests, and returns either the information URL in a redirect to the camera phone browser or the information server content directly to the browser without requiring a redirect at the camera phone. In this embodiment, the bar code symbol is a file identifier that includes a server ID and an item ID as previously mentioned. The server ID will identify which resolution server will contain the specific mapping of item IDs to information URLs. In this scenario, there will be more than one (and likely many) resolution servers employed so as they distribute the database and computing requirements amongst many computers. This also has the advantage of allowing multiple parties to have control over various resolution servers instead of one party controlling one large resolution server.

In this embodiment, the request URL contains the server ID and the item ID, and is sent to a gateway server computer 23. Each and every request URL sent by the camera phone will be sent to the same gateway server computer 23 (the address is essentially hard coded into the client application running on the camera phone). The gateway server 23 receives the request URL from the camera phone and parses out or extracts the server ID. The gateway server 23 then analyzes the server ID to determine which resolution server on the computer network is identified thereby (e.g. by reference to a database 25). The gateway server then sends the item ID to the resolution server 20 identified by the server ID. The resolution server 20 receives the item ID and performs a lookup of the item ID to retrieve an associated information URL from memory. That is, the resolution server will prepare and an information URL that indicates where the requested information may be found. The resolution server then returns the information URL to the gateway server 23.

The gateway server then interoperates with the camera phone in one of two ways, depending on how the system is configured, to provide the information content at the camera phone. In one embodiment, the gateway server sends the information URL to the information server, receives the content from the information server computer as a function of the information URL, and sends the content received from the information server to the camera-enabled cell phone.

In an alternative embodiment, the gateway server hands off the information URL to the camera phone, the camera phone sends the information URL to the information server computer, and then the camera phone receives the content directly from the information server computer as a function of the information URL.

I claim:

1. A method for accessing content from an information server computer on a computer network comprising the steps of:
   a. capturing an image of a machine-readable code with a portable wireless device;
   b. processing, on the portable wireless device, the captured image to decode the machine-readable code into a file identifier;
   c. forming, on the portable wireless device, a resource location request comprising the file identifier;
   d. transmitting, from the portable wireless device via an associated wireless communications network, the resource location request to a resolution server computer on the computer network that is interoperable with the wireless communications network;
   e. determining, at the resolution server computer, a resource location identifier associated with the resource location request;
   f. returning the resource location identifier to the portable wireless device;
   g. the portable wireless device transmitting a resource request to an information server computer designated by the resource location identifier;
   h. the information server computer receiving the resource request and returning content to the portable wireless device associated with the resource request.

2. The method of claim 1 in which the machine-readable code is a bar code symbol.

3. The method of claim 2 in which the bar code symbol is associated with an object.

4. The method of claim 3 in which the content returned to the portable wireless device is associated with the object.

5. The method of claim 4 in which the bar code symbol is a UPC code.

6. The method of claim 1 in which the computer network is a global computer network, and in which the portable wireless device communicates over a cellular network with the global computer network.

7. The method of claim 1 in which the resource location request additionally comprises a device identifier.

8. The method of claim 7 in which the resource location identifier is determined as a function of the device identifier.

9. The method of claim 1 in which the step of determining, at the resolution server computer, a resource location identifier as a function of the resource location request comprises the steps of
   i. extracting the file identifier from the resource location request; and
   ii. querying a database with the file identifier; the database comprising a plurality of mappings of file identifiers to associated resource location identifiers.

10. A system for accessing content from an information server computer on a computer network comprising:
    A. a portable wireless device comprising:
       a. a wireless transceiver;
       b. an image capture module;
       c. a display screen; and
       d. a processing circuitry adapted to:
          i. cause the wireless transceiver to selectively communicate with a wireless network to transmit and receive wireless messages, and to communicate with server computers on a global computer network;
          ii. capture, via the image capture module, an image of a machine-readable code;
          iii. process the captured image to decode the machine-readable code into a file identifier;
          iv. form a resource location request comprising the file identifier;
          v. transmit, via the wireless transceiver, the resource location request to a resolution server computer on the global computer network;
    B. a resolution server computer interconnected to the global computer network, the resolution server computer comprising processing circuitry adapted to
       a. determine a resource location identifier as a function of the resource location request received from the portable wireless device; and
       b. return the resource location identifier to the portable wireless device;
    wherein the processing circuitry of the portable wireless device is further adapted to transmit a resource request to an information server computer designated by the resource location identifier; to receive content from the information server computer as a function of the resource request; and to display the received content on the display screen.

11. The system of claim 10 in which the machine-readable code is a bar code symbol.

12. The system of claim 11 in which the bar code symbol is associated with an object.

13. The system of claim 11 in which the content returned to the portable wireless device is associated with the object.

14. The system of claim 13 in which the bar code symbol is a UPC code.

15. The system of claim 10 in which the resource location request additionally comprises a device identifier.

16. The system of claim 15 in which the resource location identifier is determined as a function of the device identifier.

17. The system of claim 10 in which the resolution server processing circuitry is adapted to determine a resource location identifier as a function of the resource location request received from the portable wireless device by
   i. extracting the file identifier from the resource location request; and
   ii. querying a database with the file identifier; the database comprising a plurality of mappings of file identifiers to associated resource location identifiers.

18. A portable wireless device for accessing content from an information server computer on a computer network comprising:
   a. a wireless transceiver;
   b. an image capture module;
   c. a display screen; and
   d. a processing circuitry adapted to:
      i. cause the wireless transceiver to selectively communicate with a wireless network to transmit and receive wireless messages, and to communicate with server computers on a global computer network;
      ii. capture, via the image capture module, an image of a machine-readable code;
      iii. process the captured image to decode the machine-readable code into a file identifier;
      iv. form a resource location request comprising the file identifier;
      v. transmit, via the wireless transceiver, the resource location request to a resolution server computer on the global computer network;
      vi. receive from the resolution server a resource location identifier determined by the resolution server as a function of the resource request;
      vii. transmit a resource request to an information server computer designated by the resource location identifier;
      viii. receive content from the information server computer as a function of the resource request; and
      ix. display the received content on the display screen.

* * * * *

UNITED STATES PATENT AND TRADEMARK OFFICE
CERTIFICATE OF CORRECTION

PATENT NO. : 7,430,588 B2 Page 1 of 1
APPLICATION NO. : 11/269139
DATED : September 30, 2008
INVENTOR(S) : Kevin D Hunter It is certified that error appears in the above-identified patent and that said Letters Patent is hereby corrected as shown below:

Title page, add the following item (63),

--Related U.S. Application Data
Continuation of application No. 10/863,580, filed on Jun. 7, 2004, now U.S. Patent No. 6,993,573. Provisional application No. 60/476,496, filed on Jun. 6, 2003.--.

Column 1, line 8: "based on" should be changed to --a continuation application of--.

Signed and Sealed this

Thirtieth Day of June, 2009

JOHN DOLL
*Acting Director of the United States Patent and Trademark Office*